United States Patent [19]

Hawley et al.

[11] 4,382,404
[45] May 10, 1983

[54] VACUUM SCREW LOADER

[75] Inventors: Charles C. Hawley, Piedmont; Benjamin Sieradzki, Berkeley, both of Calif.

[73] Assignee: Chemetron Process Equipment, Inc., Louisville, Ky.

[21] Appl. No.: 276,712

[22] Filed: Jun. 23, 1981

[51] Int. Cl.³ .......................... A22C 17/00; B01F 13/06
[52] U.S. Cl. ........................................ 99/472; 99/348; 366/139; 366/297
[58] Field of Search .................... 99/467, 472, 348; 366/139, 186, 297-306, 603; 17/35, 38, 40; 222/238, 252, 334, 412; 426/486, 404; 53/510; 241/DIG. 14; 264/101, 102, 176 R; 425/584, 376 R, DIG. 60

[56] References Cited

U.S. PATENT DOCUMENTS

| 3,314,383 | 4/1977 | Schlernitzauer | 366/139 |
| 3,599,556 | 8/1971 | Madsen | 99/472 |
| 3,908,536 | 9/1975 | Bajcar | 99/472 |
| 3,908,537 | 9/1975 | Bajcar et al. | 99/472 |
| 4,032,049 | 6/1977 | Roberts | 17/40 |

OTHER PUBLICATIONS

Brochure of Chemetron Process Equipment, Inc. dated 1980-"ANCO"—1402C Continuous Vacuumizer-Stuffer.

Primary Examiner—Philip R. Coe
Assistant Examiner—Timothy F. Simone

[57] ABSTRACT

A multi-purpose vacuum screw loader deaerates meat emulsions and meat chunk mixtures, and loads the deaerated product to a forming or casing station. A sealed vacuumized hopper has a lowermost auger for force-feeding processed product through an outlet in the bottom of the hopper to a positive displacement pump in communication with the next processing station. An agitator overlying the auger within the hopper serves to expose air pockets in the meat emulsion for more complete removal of entrained air. An inlet in the hopper positioned well above the normal product level is particularly sized to form a free-falling, film-like flow of product as the hopper is loaded whereby to expose maximum product surface area to the vacuum environment.

7 Claims, 6 Drawing Figures

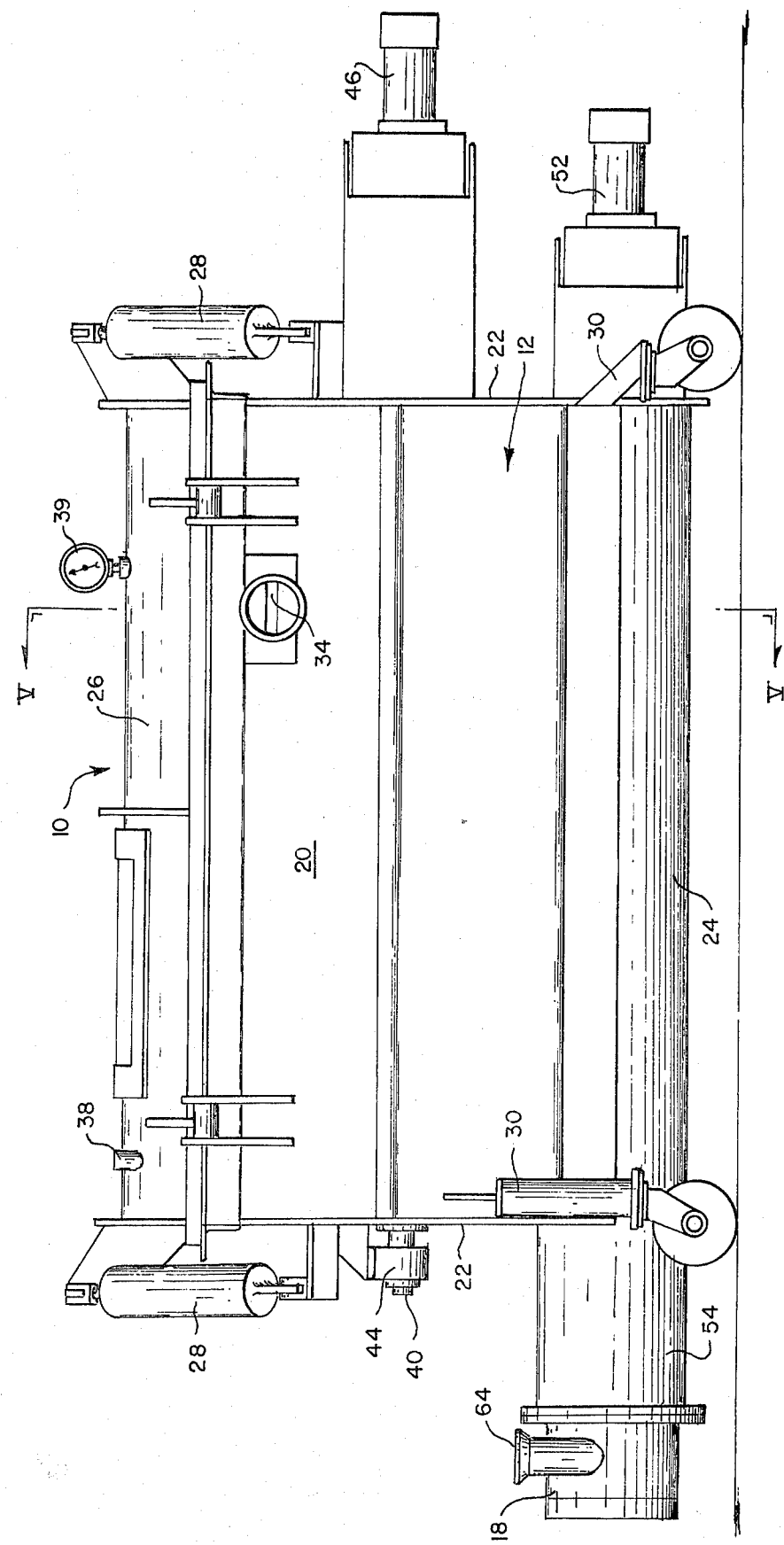

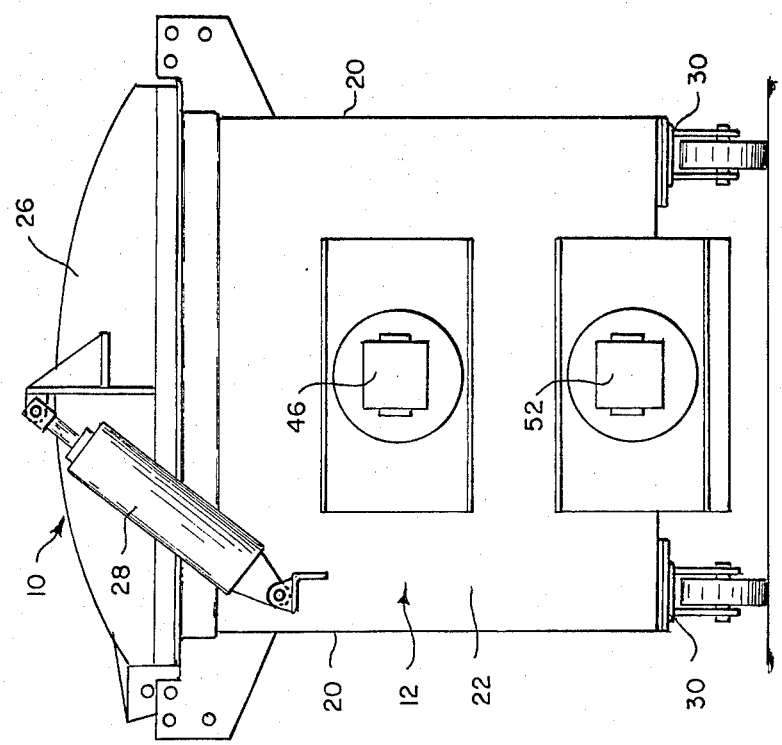
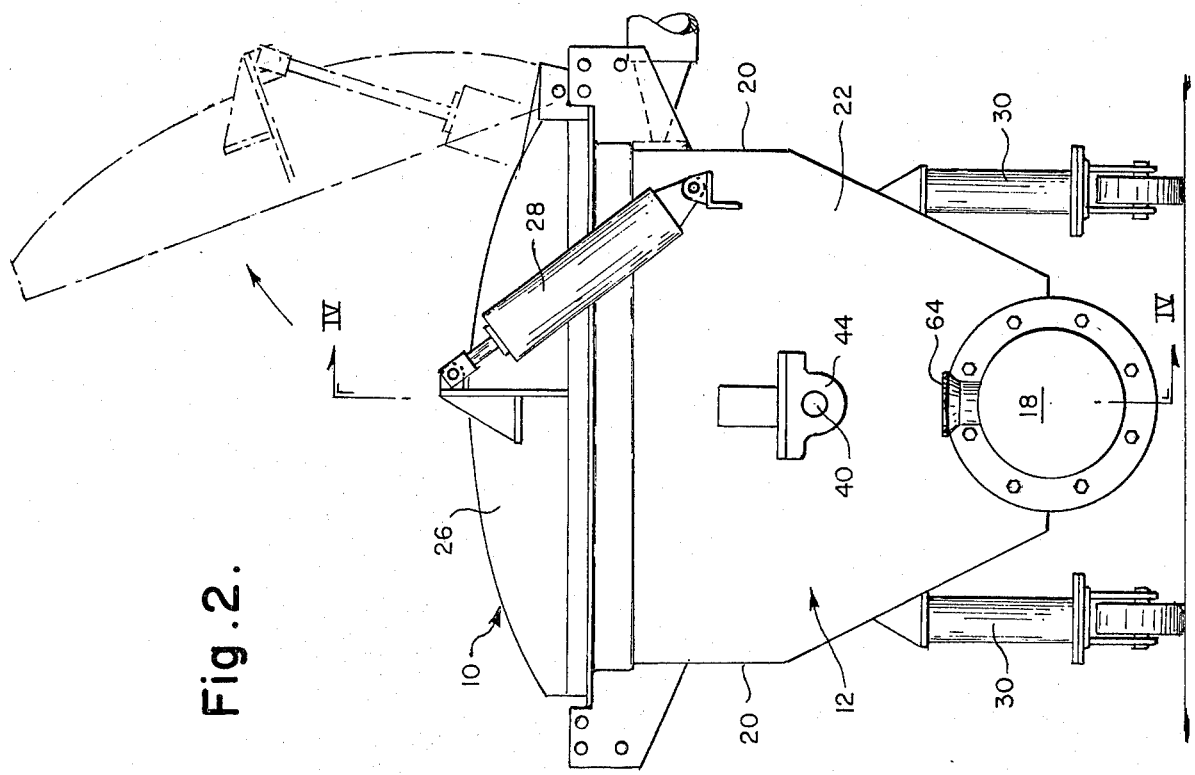

VACUUM SCREW LOADER

TECHNICAL FIELD

This invention relates to devices for processing meat products, and is particularly concerned with a multi-purpose vacuum screw loader for deaerating meat emulsions and similar food products, and loading the deaerated product into molds or casings at a subsequent processing station.

BACKGROUND ART

In the production of meat products such as sausages, weiners, and the like, a meat emulsion is prepared which is subsequently fed under pressure ("stuffed") into a casing. Precooked products, such as the so-called luncheon meats, are formed from meat emulsions which are subsequently loaded into molds for cooking. Similarly, pressed meat products are formed from mixtures of meat chunks which are fed under pressure into forming molds.

In all of the above products, it has been found desirable, and often times necessary, to remove air from the meat mixture immediately prior to loading it into a mold or casing. Deaeration at this stage in the processing not only eliminates undesirable air pockets in the final product but also appreciably increases product shelf-life. Accordingly, numerous devices have been developed for the deaeration of meat emulsions and chunky meat mixtures.

One well known machine for the deaeration of meat products is manufactured by Chemetron Process Equipment of Louisville, Ky., and sold under the ANCO trademark as a 1402C Continuous Vacuumizer-Stuffer. This device is generally disclosed in U.S. Pat. Nos. 3,599,556, 3,908,536, and 3,908,537, all owned by Chemetron Process Equipment, Inc. While this machine has proved satisfactory for many applications, difficulty has been experienced in cleaning the machine, and further, it is a relatively expensive device to manufacture.

Similar machines are produced by a number of other manufacturers, but none has proved entirely satisfactory from the standpoint of ease of cleaning, cost, and product quality. Moreover, devices of this type are a specialty machine capable of performing substantially only one or two processes, thereby making them a significant cost item, particularly for small meat packers.

DISCLOSURE OF INVENTION

The present invention concerns a multi-purpose vacuum screw loader capable, among other things, of de-aerating meat emulsions and similar products and loading them under pressure into molds at a subsequent work station, yet being easy to clean and relatively inexpensive to manufacture.

The invention comprises a sealable, vacuumized hopper having a bottom-lying mechanical auger for moving product from the hopper through an outlet to a positive displacement pump. A helical-flighted agitator is rotatably supported above the auger within the hopper for churning the product therein to expose air pockets to the vacuum in the hopper.

In preferred forms, transverse cross-section of the product inlet is horizontally elongate and positioned substantially above the normal product level of the hopper such that there is created a free flowing film as the product is introduced through the inlet into the hopper. A door on the top of the hopper permits access for batch processing if desired.

BRIEF DESCRIPTION OF THE DRAWINGS

FIG. 1 is a side elevational view of a vacuum screw loader constructed in accordance with the principles of the present invention;

FIG. 2 is an end elevational view of the loader as visualized from the left side of FIG. 1;

FIG. 3 is an end elevational view of the loader as visualized from the right side of FIG. 1;

BEST MODE FOR CARRYING OUT THE INVENTION

Figure 4:
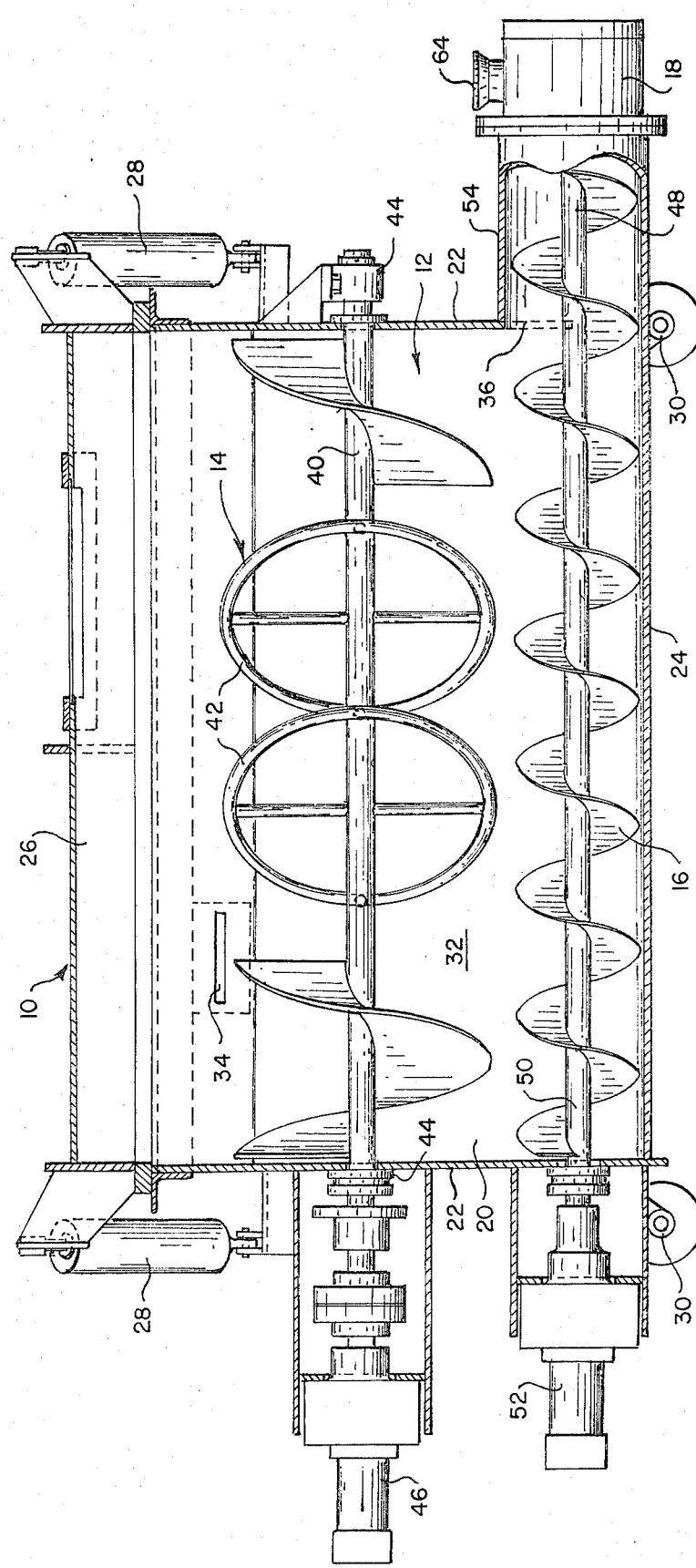
FIG. 4 is a longitudinal cross-sectional view taken along line 4—4 of FIG. 2.

In FIG. 1 there is shown a vacuum screw loader 10 comprising a hopper 12, an agitator 14 rotatably mounted within the hopper 12, an auger 16 operably disposed within the hopper 12 beneath the agitator 14, and a positive displacement pump 18 disposed at one end of the auger 16 exterior of the hopper 12. The hopper 12 is adapted to be selectively coupled in flow communication with a source of negative pressure (not shown) such that a vacuum may be created within the hopper as desired.

Figure 5:
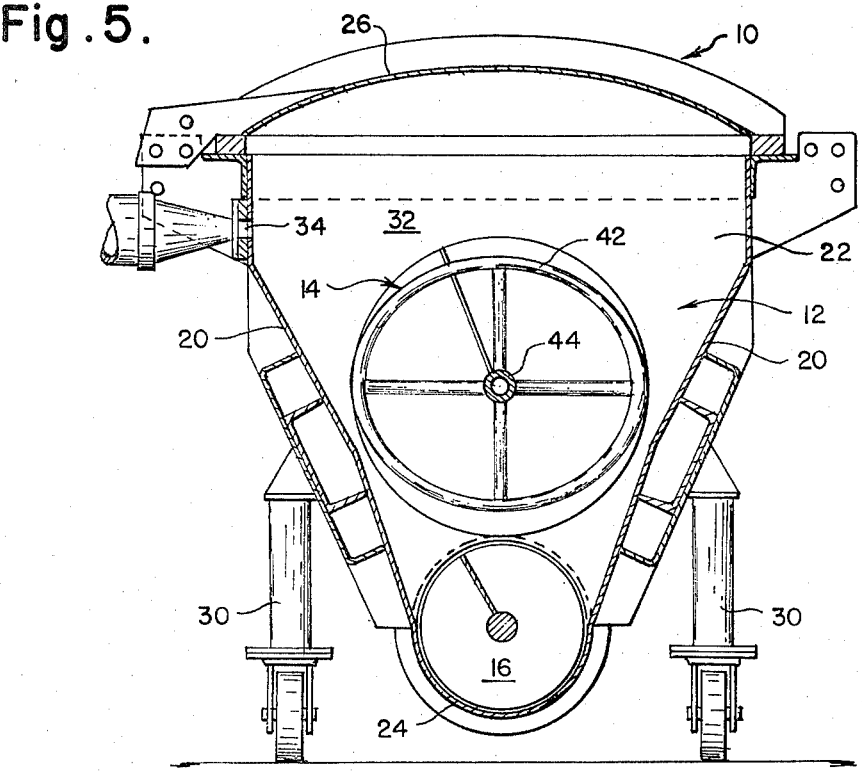
FIG. 5 is a transverse cross-sectional view taken along line 5—5 of FIG. 1.

The hopper 12 is of conventional construction having a pair of opposed sidewalls 20, spaced endwalls 22, a bottom 24 and a closed top defined by a hinged, sealable hatch 26. In preferred forms, the sidewalls 20 are synclined toward the bottom 24 as shown in FIG. 5, whereby product movement through the hopper 12 is promoted for improved cleaning. As shown in FIGS. 1 and 2, a spaced pair of hydraulic cylinder assembly 28 each extend between the hatch 26 and an endwall 22 to permit selective movement of the hatch 26 between the open and closed positions illustrated.

As shown in the drawings, four wheeled legs 30 attached to respective sidewalls 20 support the hopper 12 in a manner such that the bottom 24 is disposed generally horizontally. Of course, it will be appreciated that the legs 30 serve to render the loader 10 mobile so that it may be positioned within the processing plant as desired.

The interior of the hopper 12, as collectively defined by the sidewalls 20 and endwalls 22, bottom 24 and hatch 26, comprises a vacuum chamber 32 adapted to receive meat emulsions and mixtures of meat chunks for processing as will be described. There is provided an inlet 34 in one sidewall 20 adjacent the hatch 26 (when in the closed position) to permit introduction of product into the vacuumized chamber 32 on a continuous basis. The location of the inlet 34 is well above the normal level of product contained within the chamber when the loader is in operation. Additionally, there is formed an outlet 36 in one endwall 22 adjacent the bottom 24 to permit ejection of processed product from the chamber 32 in a manner to be described. The hatch 26 has a vacuum-fitting 38 (shown only in FIG. 1) to permit coupling to the source of negative pressure (not shown) such that the chamber 32 may be evacuated as desired. To this end, there is also provided a vacuum gage 39, such that the operator may be apprised of the operating conditions within the chamber 32 during operation of the loader 10. Further in this regard, there may be provided an inspection window in the hatch 26 to permit visual inspection.

The agitator 14 comprises an elongate control shaft 40 around which is supported ribbon flighting 42 arranged in a generally helical pattern in a manner well known for the promotion of agitation. A spaced pair of bearings 44 on opposite endwalls 22 support the shaft 40 such that the longitudinal axis thereof extends generally parallel to the bottom 24. A drive motor 46 is operably coupled to one end of the shaft 40 for powered rotation of the agitator 14. As shown in the drawing, the shaft 40 is disposed substantially equidistant from the bottom 24 and the hatch 26 and is spaced well below the inlet 34. It is to be understood that the desired operating level of meat emulsion or meat chunk mixture within the chamber 32 is just above the vertical position of the shaft 40 such that at least a portion of the flighting 42 extends above the product level during normal operation of the screw loader 10. In this regard, the hopper 12 may be equipped with an automatic high-low product level control as is known in the art.

The auger 16 is of conventional screw-type construction and extends longitudinally along the bottom 24 between the endwalls 22 in generally parallel relation to the central shaft 40 of the agitator 14. As shown in the drawing, the auger 16 projects through the outlet 36 such that one end 48 of the auger is disposed beyond the endwall 22 exterior of the chamber 32. The opposite end 50 of the auger 16 is rotatably supported on the other endwall 22 and operatively coupled to a motor 52. Motor 52 is controlled in a conventional manner for rotationing auger 16 in a direction to move product toward the outlet 36.

A sleeve 54 is mounted on the endwall 22 containing the outlet 36 and extends between the latter and the end 48 of the auger 16. The positive displacement pump 18 is supported on the outermost of the end of the sleeve 54 and receives product fed through the outlet 36 by the auger 16 as will be described. The sleeve 54 functions in conjunction with the portion of the auger extending beyond the outlet 36 to form a vaporlock for precluding loss of the vacuum in the chamber 32.

The pump 18 has a discharge port 64, which delivers product under pressure for subsequent processing. Any of a number of various extruding horns or adaptors may be fitted to port 64 to effect loading of molds or stuffing of casings.

Figure 6:
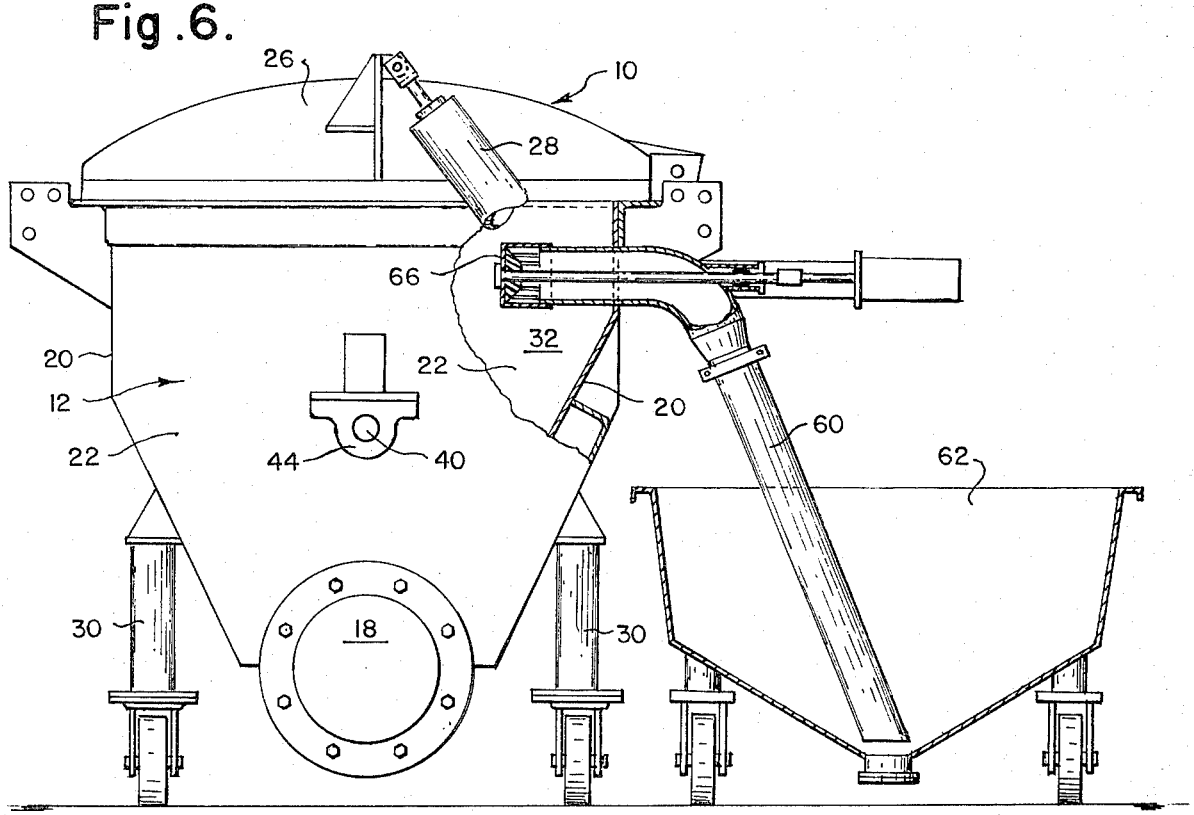
FIG. 6 is an end elevational view of a second embodiment of the invention.

In preferred forms the inlet 34 is adapted to be coupled with an emulsifier such that meat emulsion is fed through the inlet 34 into the chamber 32 on a continuous basis. However, in a second embodiment of the invention as shown in FIG. 6, the inlet 34 may be provided with a suction tube 60 for permitting self-loading of the chamber 32 from a tub 62 or the like by action of the vacuum in the chamber 32. In this embodiment, the tube 60 has a flow control valve 66 for monitoring product inflow.

INDUSTRIAL APPLICABILITY

The screw loader 10 has wide application in the processing of meat products. It can function in its primary purpose as a vacuumizer-loader to deaerate meat emulsions and meat chunk mixtures prior to subsequent processing and to deliver the deaerated product under pressure to the next processing station. The loader 10 can function as a surge hopper and pump when deaeration is not required. Finally the loader 10 can operate as a stuffer by virtue of the positive displacement pump 18.

In the deaerating mode, the chamber 32 is evacuated and the agitator 14 and auger 16 are driven on a continuous basis. The action of the agitator 14 exposes hidden air pockets within the meat product mixture to the vacuum environment such that this entrapped air is removed prior to ejection of the product from the chamber 32. The action of the screw auger 16 assures that the deaerated product is continuously moved through the outlet 36 to the positive displacement pump 18. Consequently, undesired cavitation is not encountered at the pump 16. The provision of the hatch 26 permits rapid loading for batch processing when operating on a non-continuous basis.

In the surge hopper mode, the loader 10 can function to receive, hold, and pump products that do not require deaeration. In this mode, the hatch 26 may be in either the open or closed position.

When operating as a stuffer, the pump 18 directly feeds product into casings. Of course, this operation can be employed regardless of whether or not the loader 10 is functioning as a deaerator.

It has been found that when operating in the vacuumized mode, product produced by the loader 10 is far superior to that produced by conventional machines of this type. It is believed that the combined operation of the agitator 14 and the auger 16 functions to substantially improve the deaeration of the meat emulsion product without detrimentally affecting other desired characteristics of the product.

Cleaning of the loader 10 is greatly facilitated because the combined action of the auger 16 and the pump 18 serves to substantially empty the machine after use. This is in contrast to other machines of this nature where large volumes of product are left in the machine and must be manually removed during cleaning.

From the foregoing, it can be seen that the present invention offers an economical and versatile machine which serves a well-felt need in the meat processing industry.

What we claim is:

1. A vacuum screw loader for sequentially deaerating and pressure packing meat emulsion and similar food products, said loader including:
   a sealable hollow hopper defining a vacuum chamber adapted to receive a volume of said emulsion;
   an inlet in said hopper adapted to permit the introduction of said emulsion into said chamber;
   an outlet in said hopper below and remote from said inlet for removal of said emulsion from said chamber;
   an elongate agitator rotatably mounted on said hopper within said chamber below said inlet;
   a positive displacement pump coupled with said outlet to receive emulsions passing therethrough;
   means coupled with said hopper to create reduced pressure in said chamber for removal of entrained air in said emulsions released by the operation of said agitator; and
   a mechanical auger within the chamber operatively mounted on the hopper adjacent said outlet for force feeding said emulsion to said pump through the outlet.

2. The invention of claim 1, said hopper having a spaced pair of parallel, normally upright, opposed endwalls, said agitator being supported at opposite ends to respective said endwalls, the axis of rotation of said auger extending parallel to the longitudinal axis of said agitator.

3. The invention of claim 2, said hopper having a pair of opposed synclined sidewalls extending between said endwalls, said inlet being disposed in one of said sidewalls.

4. The invention of claim 3, the longitudinal axis of said agitator extending perpendicularly of said endwalls.

5. The invention of claim 4, said inlet being positioned with respect to said auger in a manner such that the direction of flow of emulsion into said hopper is generally perpendicular of said longitudinal axis of the agitator.

6. The invention of claim 5 generally reclaims said inlet having an elongate transverse cross section, the longitudinal axis of said cross section extending generally horizontally.

7. The invention of claim 1, said hopper being provided with a sealable door for access into said chamber whereby said loader may be utilized for batch processing.

* * * * *